US012686763B2

(12) United States Patent
De Santis et al.

(10) Patent No.: US 12,686,763 B2
(45) Date of Patent: Jul. 21, 2026

(54) MULTIMODAL ETHYLENE COPOLYMER

(71) Applicant: BOREALIS AG, Vienna (AT)

(72) Inventors: Felice De Santis, Linz (AT); Matthias Hoff, Linz (AT); Kalin Simeonov, Linz (AT); Davide Tranchida, Linz (AT); Martin Neuheimer, Linz (AT); Stefan Pollhammer, Linz (AT)

(73) Assignee: Borealis AG, Vienna (AT)

( * ) Notice: Subject to any disclaimer, the term of this patent is extended or adjusted under 35 U.S.C. 154(b) by 728 days.

(21) Appl. No.: 18/017,274

(22) PCT Filed: Jul. 23, 2021

(86) PCT No.: PCT/EP2021/070628

§ 371 (c)(1),
(2) Date: Jan. 20, 2023

(87) PCT Pub. No.: WO2022/018239

PCT Pub. Date: Jan. 27, 2022

(65) Prior Publication Data

US 2023/0227637 A1 Jul. 20, 2023

(30) Foreign Application Priority Data

Jul. 23, 2020 (EP) .................................... 20187396

(51) Int. Cl.

| | |
|---|---|
| ***C08L 23/0807*** | (2025.01) |
| ***C08F 2/06*** | (2006.01) |
| ***C08F 2/34*** | (2006.01) |
| ***C08F 4/659*** | (2006.01) |
| ***C08F 210/16*** | (2006.01) |
| ***C08J 5/18*** | (2006.01) |

(52) U.S. Cl.

CPC ............ *C08L 23/0815* (2013.01); *C08F 2/06* (2013.01); *C08F 2/34* (2013.01); *C08F 4/659* (2013.01); *C08F 210/16* (2013.01); *C08J 5/18* (2013.01); *C08L 2203/16* (2013.01)

(58) Field of Classification Search

CPC .. C08L 23/815; C08L 2203/16; C08F 210/16; C08F 2/00; C08F 2/01; C08F 2/06; C08F 2/34; C08F 4/659; C08J 5/18; C08J 2323/08

See application file for complete search history.

(56) References Cited

U.S. PATENT DOCUMENTS

| | | | | |
|---|---|---|---|---|
| 2008/0269421 | A1* | 10/2008 | Nilsen ................... | C08F 210/16 525/240 |
| 2017/0327678 | A1* | 11/2017 | Kela ..................... | C08F 210/16 |
| 2019/0144583 | A1 | 5/2019 | Galgali et al. | |

FOREIGN PATENT DOCUMENTS

| | | | |
|---|---|---|---|
| WO | 2009071324 | A1 | 6/2009 |
| WO | 2016083208 | A1 | 6/2016 |
| WO | 2016207270 | A1 | 12/2016 |
| WO | 2017216094 | A1 | 12/2017 |

OTHER PUBLICATIONS

International search report and written opinion in PCT/EP2021/070628. Mailed Jul. 23, 2021. 13 pages.

* cited by examiner

*Primary Examiner* — Shane Fang

(74) *Attorney, Agent, or Firm* — Meunier Carlin & Curfman LLC

(57) ABSTRACT

The present invention relates to a new multimodal ethylene copolymer (P), to the use of the copolymer in film applications and to a film comprising the copolymer of the invention.

13 Claims, No Drawings

MULTIMODAL ETHYLENE COPOLYMER

The present invention relates to a new multimodal ethylene copolymer, to the use of the copolymer in film applications and to a film comprising the copolymer of the invention.

Unimodal polyethylene (PE) polymers, for instance SSC products, are usually used for film application. Unimodal PE polymers have for instance good optical properties, like low haze, but for instance, the melt processing of such polymers is not satisfactory in production point of view and may cause quality problems of the final product as well. Multimodal PE polymers with two or more different polymer components are better to process, but e.g. melt homogenization of the multimodal PE may be problematic resulting to inhomogeneous final product evidenced e.g. with high gel content of the final product.

Sealing Initiation Temperature is a key property of a PE film, especially in combination with mechanical properties and the ease of conversion.

Different metallocene unimodal PE materials could be found, in the market in which the melting temperature is decreasing with density, as a consequence of the decreasing crystallinity content. Consequently, also the Sealing Initiation Temperature is decreasing in these materials with the decreasing density, thus keeping a narrow sealing processing window that could be roughly defined as the difference in between the Sealing Initiation Temperature and the melting temperature (Tm−SIT).

Furthermore decreasing the density of the metallocene PE materials also other properties are negatively influenced (e.g. stiffness). These disadvantages are strictly related to the thermomechanical behavior of unimodal PE materials, in which is not possible to enlarge the melting window and to introduce a specific comonomer to a specific fraction of the molecular weight distribution.

EP 1472298 A of Borealis discloses multimodal PE polymer compositions having two different comonomers. The multimodal PE polymers are polymerized in the presence of a metallocene catalyst. Examples disclose multimodal PE polymer having two polymer components with, for instance, different type of comonomers.

The publication does seem to define any range for the melt flow ratio, $MFR_{21}/MFR_2$ ($FRR_{21/2}$), of the final multimodal PE polymer, however said melt flow ratio of the exemplified polymers vary within the range of 38-55. EP 1472298 does not mention any sealing properties of the final multimodal PE polymer.

WO 2016083208 of Borealis discloses further metallocene catalyzed multimodal PE polymer compositions comprising ethylene polymer component (A) and (B). It is stated that such polymer compositions as described in WO 2016083208 have excellent sealing properties, indicated e.g. as low hot tack temperature at maximum hot tack force and provided sealing initiation even in low temperatures. The multimodal PE preferably has a ratio of [the amount (mol %) of alpha-olefin comonomer having from 4 to 10 carbon atoms comonomer present in ethylene polymer component (A)] to [the amount (mol %) of at least two alpha-olefin comonomers having from 4 to 10 carbon atoms of the final multimodal polymer of ethylene (a)] is of 0.2 to 0.6, preferably of 0.24 to 0.5. The total comonomer content of the polymers according to the inventive examples is between 2.0 and 2.9 mol %.

No values for sealing initiation temperatures are given.

There is therefore a continuous need to find multimodal PE polymers with further improved sealing properties, i.e. very low sealing initiation temperature (SIT) and a broad sealing window, i.e. a high value for Tm−SIT.

DESCRIPTION OF THE INVENTION

The present invention is therefore directed to a multimodal ethylene copolymer (P) comprising a) an ethylene polymer (A) having a $MFR_2$ of 1 to 50 g/10 min (190° C., 2.16 kg, ISO 1133), a comonomer content in the range of 0.05 mol % to less than 1.0 mol %, the comonomer being selected from $C_4$ to $C_{12}$ α-olefins, and b) an ethylene copolymer (B) having a comonomer content in the range of 5.6 mol % to 10.0 mol %, the comonomer being selected from $C_4$ to $C_{12}$ α-olefins, whereby the comonomer of ethylene copolymer (B) is different from the comonomer of ethylene copolymer (A) and wherein further (i) the multimodal ethylene copolymer (P) has a total comonomer content in the range of 3.2 mol % to 5.7 mol %, and (ii) the weight ratio of the ethylene copolymer (A) to the ethylene copolymer (B) is in the range of 25/75 to below 60/40.

Term "multimodal" in context of polymer of ethylene (P) means herein multimodality with respect to, i.e. difference between, the comonomer type and the comonomer content(s) present in the ethylene polymer components (A) and (B);

Additionally the multimodal polymer of ethylene (P) can have further multimodality with respect to melt flow rate (MFR) of the ethylene polymer components (A) and (B), i.e. the ethylene polymer components (A) and (B) have different MFR values and/or density.

The ethylene polymer component (A) and the ethylene polymer component (B), when both mentioned, are also be referred to as "ethylene polymer component (A) and (B)".

The multimodal ethylene copolymer (P) is also referred to as "ethylene copolymer (P)" or "polymer of ethylene (P)".

Unexpectedly, the ethylene copolymer (P) of the invention provides improved sealing properties, such as for example low sealing initiation temperature (SIT) and a broad sealing window.

The invention is further directed to a film comprising at least one layer comprising the ethylene copolymer (P). The film can be a monolayer film comprising the ethylene copolymer (P) or a multilayer film, wherein at least one layer comprises the ethylene copolymer (P). The terms "monolayer film" and multilayer film" have well known meanings in the art.

The following preferable embodiments, properties and subgroups of the ethylene copolymer (P), the ethylene polymer components (A) and (B) thereof and the film of the invention including the preferable ranges thereof, are independently generalizable, so that they can be used in any order or combination to further define the preferable embodiments of the ethylene copolymer (P) and the article, respectively film of the invention.

Multimodal Ethylene Copolymer (P) as Well as Ethylene Polymer Component (A) and Ethylene Polymer Component (B)

As already mentioned above, the polymer of ethylene (P) is referred herein as "multimodal", since the ethylene polymer component (A) and the ethylene polymer component (B) have a different comonomer type and different comonomer content present in the ethylene polymer components (A) and (B).

The term “multi” includes “bimodal” composition consisting of two components having the difference in type and amount of comonomer present in ethylene polymer components (A) and (B).

The multimodal ethylene copolymer (P) comprises at least two comonomers with 4 to 12 carbon atoms, preferably with 4 to 10 carbon atoms and more preferably selected from 1-butene, 1-hexene and 1-octene, especially 1-butene and 1-hexene.

Preferably, the alpha-olefin comonomer having from 4 to 12 carbon atoms of ethylene polymer component (A) is 1-butene and the alpha-olefin comonomer having from 4 to 12 carbon atoms of ethylene polymer component (B) is 1-hexene.

Preferably, the ratio of [the amount (mol %) of alpha-olefin comonomer having from 4 to 12 carbon atoms present in ethylene polymer component (A)] to [the amount (mol %) of the two alpha-olefin comonomers having from 4 to 12 carbon atoms of the final multimodal ethylene copolymer (P) is 0.05 to 0.20, preferably 0.08 to 0.17.

The comonomer content of component (A) and (B) can be measured, or, in case, and preferably, one of the components is produced first and the other thereafter in the presence of the first produced in so called multistage process, then the comonomer content of the first produced component, e.g. component (A), can be measured and the comonomer content of the other component, e.g. component (B), can be calculated according to following formula:

Comonomer content (mol %) in component *B*=(comonomer content (mol %) in final product−(weight fraction of component *A**comonomer content (mol %) in component *A*))/(weight fraction of component *B*)

Preferably, the amount (mol %) of alpha-olefin comonomer having from 4 to 12 carbon atoms, preferably from 4 to 12, more preferably selected from 1-butene, 1-hexene and 1-octene, especially 1-butene, present in the ethylene polymer component (A) is from 0.05 mol % to less than 1.0 mol %, more preferably from 0.10 to 0.90 mol %, even more preferably of from 0.15 to 0.80 mol %, and still more preferably of from 0.20 to 0.60 mol %.

In an embodiment, the amount (mol %) of alpha-olefin comonomer having from 4 to 12 carbon atoms, preferably from 4 to 12, more preferably selected from 1-butene, 1-hexene and 1-octene, especially 1-hexene, present in the ethylene polymer component (B) is of 5.6 to 10.0 mol %, preferably of 5.8 to 9.5 mol %, more preferably of 6.0 to 9.0 mol %, even more preferably of 6.0 to 8.5 mol %.

The total amount of comonomers present in the multimodal ethylene copolymer (P) is of 3.2 to 5.7 mol %, preferably of 3.3 to 5.2 mol %, more preferably of 3.5 to 5.0 mol %.

The specific multimodality, i.e. the difference between the comonomer type and comonomer content between the ethylene polymer component (A) and the ethylene polymer component (B) contributes to highly advantageous sealing properties, e.g. to the excellent sealing initiation temperature at very low temperatures and the broad sealing window.

Additionally, the ethylene polymer component (A) and the ethylene polymer component (B) may be produced under different polymerization conditions resulting in different Melt Flow Rates (MFR, e.g. $MFR_2$). I.e. the polymer composition is also multimodal with respect to difference in MFR of the two ethylene polymer components (A) and (B).

The term “multi” includes thus also “bimodal” composition consisting of two components having the difference in said MFR.

The ethylene polymer component (A) has a $MFR_2$ (190° C., 2.16 kg, ISO 1133) in the range of 1.0 to 50.0 g/10 min, preferably in the range of 1.0 to 40.0, more preferably in the range of 1.0 to 30.0, even more preferably in the range of 2.0 to 20.0, yet more preferably in the range of 2.0 to 15.0, still more preferably in the range of 2.0 to 10.0 g/10 min, like 2.5 to 7.0 g/10 min.

The $MFR_2$ (190° C., 2.16 kg, ISO 1133) of the multimodal ethylene copolymer (P) is in the range of from 0.5 to 7.0, preferably of from 0.8 to 5.0 g/10 min, more preferably of from 1.0 to 4.0 g/10 min and still more preferably of from 1.2 to 3.5 g/10 min.

If the $MFR_2$ of ethylene polymer components, e.g. component (B), cannot be measured, because it cannot be isolated from the mixture of the ethylene polymer components (A) and (B), then it can be calculated ($MI_2$ below) using so called Hagström equation (Hagström, The Polymer Processing Society, Europe/Africa Region Meeting, Gothenburg, Sweden, Aug. 19-21, 1997):

$$MI_b = \left( w \cdot MI_1^{-\frac{w^{-b}}{a}} + (1-w) \cdot MI_2^{-\frac{w^{-b}}{a}} \right)^{-a \cdot w^b} \quad \text{(eq. 3)}$$

According to said Hagström, in said equation (eq.3), a=5.2 and b=0.7 for $MFR_2$. Furthermore, w is the weight fraction of the other ethylene polymer component, e.g. component (A), having higher MFR. The ethylene polymer component (A) can thus be taken as the component 1 and the ethylene polymer component (B) as the component 2. $MI_b$ is the $MFR_2$ of the final polymer of ethylene (P). The $MFR_2$ of the ethylene polymer component (B) ($MI_2$) can then be solved from equation 1 when the $MFR_1$ of the ethylene polymer component (A) ($MI_2$) and the final polymer of ethylene (1) ($MI_b$) are known.

Even more preferably the multimodal ethylene copolymer (P) is further multimodal with respect to difference in density between the ethylene polymer component (A) and ethylene polymer component (B). Preferably, the density of ethylene polymer component (A) is different, preferably higher, further preferred at least 41 kg/m$^3$ higher, even further preferred 42 kg/m$^3$ higher, than the density of the ethylene polymer component (B). More preferably, the density of the ethylene polymer component (A) is in the range of 925 to 950, preferably in the range of 930 to 945, kg/m$^3$ and/or the density of ethylene polymer component (B) is in the range of 880 to 915, preferably in the range of 885 to 913 kg/m$^3$, like 885 to 905 kg/m$^3$.

The multimodal ethylene copolymer (P) is preferably a linear low density polyethylene (LLDPE) which has a well known meaning in the state of the art. Even more preferably, the density of the multimodal ethylene copolymer (P) is in the range of 905 to 920, preferably of 906 to 918 kg/m$^3$.

More preferably, the multimodal ethylene copolymer (P) is multimodal at least with respect to, i.e. has a difference between the $MFR_2$, the comonomer type and the comonomer content (mol %), as well as with respect to, i.e. has a difference between, the density of the ethylene polymer component (A) and ethylene polymer component (B), as defined above, below or in the claims including any of the preferable ranges or embodiments of the polymer of ethylene (P).

Most preferably the polymer of ethylene (P) of the invention, as defined above, below or in claims, comprises, preferably consisting of, an ethylene polymer component (A) and an ethylene polymer component (B), wherein the ethylene polymer component (A) has $MFR_2$ (190° C., 2.16 kg, ISO 1133) in the range of 1.0 to 50.0 g/10 min, preferably in the range of 1.0 to 40.0, more preferably in the range of 1.0 to 30.0, even more preferably in the range of 2.0 to 20.0, yet more preferably in the range of 2.0 to 15.0, still more preferably in the range of 2.0 to 10.0 g/10 min, like 2.5 to 5.0 g/10 min;

more preferably, the ratio of the $MFR_2$ (190° C., 2.16 kg, ISO 1133) of ethylene polymer component (A) to the $MFR_2$ (190° C., 2.16 kg, ISO 1133) of the final multimodal ethylene copolymer (P) is between 0.5 to 30, preferably between 0.6 to 20, more preferably between 0.7 to 10, even more preferably between 0.8 to 5.0, yet more preferably between 0.9 to 3.0; and wherein the ethylene polymer component (A) has different comonomer than the ethylene polymer (B);

more preferably, the ratio of [the amount (mol %) of alpha-olefin comonomer having from 4 to 12 carbon atoms present in ethylene polymer component (A)] to [the amount (mol %) of the two alpha-olefin comonomers having from 4 to 12 carbon atoms of the final multimodal ethylene copolymer (P) is in the range of 0.05 to 0.20, preferably of 0.08 to 0.17;

even more preferably, wherein the alpha-olefin comonomer having from 4 to 10 carbon atoms of ethylene polymer component (A) is 1-butene and the alpha-olefin comonomer having from 4 to 10 carbon atoms of ethylene polymer component (B) is 1-hexene;

and wherein the ethylene polymer component (A) has different, preferably higher, density than the density of the ethylene polymer component (B)

more preferably density of the multimodal ethylene copolymer (P) in the range of 905 to 920, preferably of 906 to 918 kg/$m^3$;

even more preferably the density of the ethylene polymer component (A) is in the range of 925 to 950 kg/$m^3$, preferably in the range of 930 to 945 kg/$m^3$.

In an embodiment, the multimodal ethylene copolymer (P) has an Mw/Mn between 2.3 and 4.8, preferably 2.5 and 4.6, further preferred between 2.8 and 4.4, like 3.0 to 4.3.

The melting temperature (Tm) measured according to ISO 11357-3 of the ethylene copolymer (P) is preferably at least 115.0° C., more preferably at least 120° C. Thus, it is in particular appreciated that the melting temperature (Tm) measured according to ISO 11357-3 of the ethylene copolymer (P) is in the range of 117° C. to 133° C., more preferably in the range of 120° C. to 130° C.

In a further embodiment, the multimodal ethylene copolymer (P) may have a sealing initiation temperature (SIT), determined as described in the Experimental part, between 55° C. and 90° C., preferably between 60° C. and 88° C., further preferred between 62° C. and 86° C., and more preferred between 63° C. and 84° C.

In another embodiment, the multimodal ethylene copolymer (P) may have a broad sealing window, meaning a difference between the melting temperature (Tm) and the sealing initiation temperature (SIT), determined as described in the Experimental part, Tm−SIT, of at least 37° C., preferably at least 39° C.

The multimodal ethylene copolymer (P) comprises the ethylene polymer component (A) in an amount of 25.0 to 60.0 wt %, preferably of 32.0 to 50.0 wt %, more preferably of 35.0 to 48.0 wt % and the ethylene polymer component (B) in an amount of 40.0 to 75.0 wt %, preferably of 50.0 to 68.0 wt %, more preferably of 52.0 to 65.0 wt %, based on the total amount (100 wt %) of the polymer of ethylene (P). Most preferably, the polymer of ethylene (P) consists of the ethylene polymer components (A) and (B) as the sole polymer components. Accordingly, the split between ethylene polymer component (A) to ethylene polymer component (B) is (25 to 75):(60 to 40) preferably (32 to 68):(50 to 50), more preferably (35 to 65):(48 to 52).

The polymer of ethylene (P) may contain further polymer components and optionally additives and/or fillers. In case the polymer of ethylene (P) contains further polymer components, then the amount of the further polymer component (s) typically varies between 3.0 to 20.0 wt % based on the combined amount of the polymer of ethylene (P) and the other polymer component(s).

The optional additives and fillers and the used amounts thereof are conventional in the field of film applications. Examples of such additives are, among others, antioxidants, process stabilizers, UV-stabilizers, pigments, fillers, antistatic additives, antiblock agents, nucleating agents, acid scavengers as well as polymer processing agent (PPA).

It is understood herein that any of the additives and/or fillers can optionally be added in so-called master batch, which comprises the respective additive(s) together with a carrier polymer. In such case the carrier polymer is not calculated to the polymer components of the polymer of ethylene (P), but to the amount of the respective additive(s), based on the total amount of polymer composition (100 wt %).

It is noted herein, that the polymer of ethylene (P) may optionally comprise a prepolymer component in an amount up to 20.0 wt %, which has a well-known meaning in the art. In such case, the prepolymer component is calculated into one of the ethylene polymer components (A) or (B), preferably into the amount of the ethylene polymer component (A), based on the total amount of the polymer of ethylene (P).

The multimodal ethylene copolymer (P) is preferably produced using a coordination catalyst. More preferably, the ethylene polymer components (A) and (B) of the polymer of ethylene (P) are preferably produced using a single site catalyst, which includes metallocene catalyst and non-metallocene catalyst, which all terms have a well-known meaning in the art. The term "single site catalyst" means herein the catalytically active metallocene compound or complex combined with a cocatalyst. The metallocene compound or complex is referred herein also as organometallic compound (C).

The organometallic compound (C) comprises a transition metal (M) of Group 3 to 10 of the Periodic Table (IUPAC 2007) or of an actinide or lanthanide.

The term "an organometallic compound (C)" in accordance with the present invention includes any metallocene or non-metallocene compound of a transition metal, which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well as lanthanides or actinides.

In an embodiment, the organometallic compound (C) has the following formula (I):

$$(L)_m R_n M X_q \quad (I)$$

wherein

"M" is a transition metal (M) transition metal (M) of Group 3 to 10 of the Periodic Table (IUPAC 2007), each "X" is independently a monoanionic ligand, such as a σ-ligand, each "L" is independently an organic ligand which coordinates to the transition metal "M", "R" is a bridging group linking said organic ligands (L), "m" is 1, 2 or 3, preferably 2

"n" is 0, 1 or 2, preferably 0 or 1,

"q" is 1, 2 or 3, preferably 2 and m+q is equal to the valence of the transition metal (M).

"M" is preferably selected from the group consisting of zirconium (Zr), hafnium (Hf), or titanium (Ti), more preferably selected from the group consisting of zirconium (Zr) and hafnium (Hf). "X" is preferably a halogen, most preferably Cl.

Most preferably, the organometallic compound (C) is a metallocene complex, which comprises a transition metal compound, as defined above, which contains a cyclopentadienyl, indenyl or fluorenyl ligand as the substituent "L". Further, the ligands "L" may have one or more substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

In an embodiment of the invention the metallocene complex is bis(1-methyl-3-n-butylcyclopentadienyl) zirconium (IV) chloride.

In another embodiment, the organometallic compound (C) has the following formula (II):

(II)

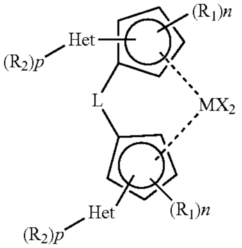

wherein each X is independently a halogen atom, a C1-6-alkyl, C1-6-alkoxy group, phenyl or benzyl group;

each Het is independently a monocyclic heteroaromatic containing at least one heteroatom selected from O or S;

L is —R'2Si—, wherein each R' is independently C1-20 hydrocarbyl or C1-10 alkyl substituted with alkoxy having 1 to 10 carbon atoms;

M is Ti, Zr or Hf;

each $R_1$ is the same or different and is a C1-6 alkyl group or C1-6 alkoxy group;

each n is 1 to 2;

each $R_2$ is the same or different and is a C1-6 alkyl group, C1-6 alkoxy group or —Si(R)3 group;

each R is C1-10 alkyl or phenyl group optionally substituted by 1 to 3 C1-6 alkyl groups; and each p is 0 to 1.

Preferably, the compound of formula (II) has the structure (II')

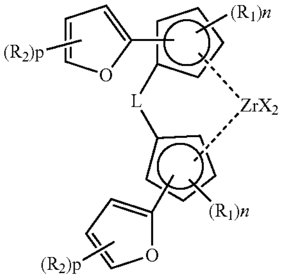

wherein each X is independently a halogen atom, a C1-6-alkyl, C1-6-alkoxy group, phenyl or benzyl group;

L is a Me2Si—;

each $R_1$ is the same or different and is a C1-6 alkyl group, e.g. methyl or t-Bu;

each n is 1 to 2;

$R_2$ is a —Si(R)3 alkyl group; each p is 1;

each R is C1-6 alkyl or phenyl group.

Highly preferred complexes of formula (II) are

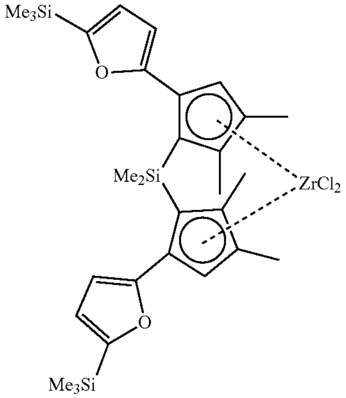

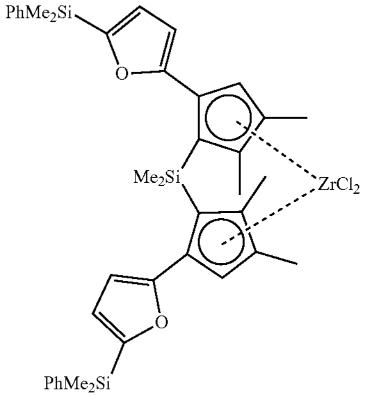

-continued

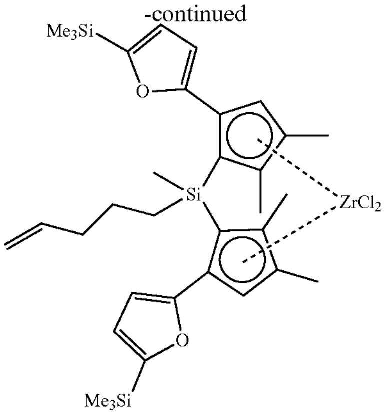

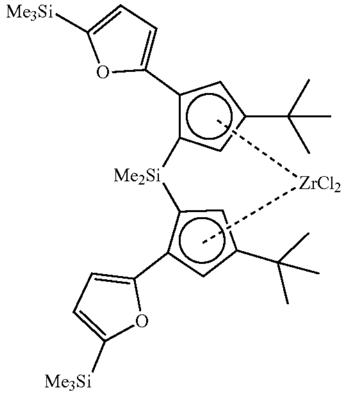

Most preferred single site catalyst is a metallocene catalyst which means the catalytically active metallocene complex, as defined above, together with a cocatalyst, which is also known as an activator. Suitable activators are metal alkyl compounds and especially aluminum alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

More preferably the ethylene polymer components (A) and (B) of the polymer of ethylene (P) are produced using, i.e. in the presence of, the same metallocene catalyst.

The multimodal ethylene polymer (P) may be produced in any suitable polymerization process known in the art. The ethylene polymer component (A) is preferably produced in a first polymerization zone and the ethylene polymer component (B) is produced in a second polymerization zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations. Suitable processes comprising cascaded slurry and gas phase polymerization stages are disclosed, among others, in WO-A-92/12182 and WO-A-96/18662.

It is often preferred to remove the reactants of the preceding polymerization stage from the polymer before introducing it into the subsequent polymerization stage. This is preferably done when transferring the polymer from one polymerization stage to another.

The catalyst may be transferred into the polymerization zone by any means known in the art. For example, it is possible to suspend the catalyst in a diluent and maintain it as homogeneous slurry, to mix the catalyst with a viscous mixture of grease and oil and feed the resultant paste into the polymerization zone or to let the catalyst settle and introduce portions of thus obtained catalyst mud into the polymerization zone.

The polymerization, preferably of the ethylene polymer component (A), in the first polymerization zone is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons and preferred diluent is propane.

The ethylene content in the fluid phase of the slurry may be from 2 to about 50% by mole, preferably from about 2 to about 20% by mole and in particular from about 3 to about 12% by mole.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors, the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art. Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

The polymerization, preferably of the ethylene polymer component (B), in the second polymerization zone is preferably conducted in gas phase, preferably in a fluidized bed reactor, in a fast fluidized bed reactor or in a settled bed reactor or in any combination of these. The polymerization in the second polymerization zone is more preferably conducted in a fluidized bed gas phase reactor, wherein ethylene is polymerized together with at least one comonomer in the presence of a polymerization catalyst and, preferably in the presence of the reaction mixture from the first polymerization zone comprising the ethylene polymer component (A) in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature, which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed.

Typically, the fluidized bed polymerization reactor is operated at a temperature within the range of from 50 to 100° C., preferably from 65 to 90° C. The pressure is suitably from 10 to 40 bar, preferably from 15 to 30 bar.

The polymerization of at least ethylene polymer component (A) and ethylene polymer component (B) in the first and second polymerization zones may be preceded by a prepolymerization step.

The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably, prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 40 to 70° C.

The pressure is not critical and is typically from 1 to 150 bar, preferably from 10 to 100 bar.

The catalyst components are preferably all introduced to the prepolymerization step. Preferably, the reaction product of the prepolymerization step is then introduced to the first polymerization zone. Also preferably, as mentioned above, the prepolymer component is calculated to the amount of the ethylene polymer component (A).

It is within the knowledge of a skilled person to adapt the polymerization conditions in each step as well as feed streams and resident times to obtain the claimed multimodal ethylene copolymer (P).

The multimodal ethylene copolymer (P) comprising at least, and preferably solely, the ethylene polymer components (A) and (B) obtained from the second polymerization zone, which is preferably a gas phase reactor as described above, is then subjected to conventional post reactor treatment to remove i.a. the unreacted components.

Thereafter, typically, the obtained polymer is extruded and pelletized. The extrusion may be conducted in the manner generally known in the art, preferably in a twin-screw extruder. One example of suitable twin-screw extruders is a co-rotating twin-screw extruder. Those are manufactured, among others, by Coperion or Japan Steel Works. Another example is a counter-rotating twin-screw extruder. Such extruders are manufactured, among others, by Kobe Steel and Japan Steel Works. Before the extrusion at least part of the desired additives, as mentioned above, are preferably mixed with the polymer. The extruders typically include a melting section where the polymer is melted and a mixing section where the polymer melt is homogenized.

Film of the Invention

The film of the invention comprises at least one layer comprising the multimodal ethylene copolymer (P). The film can be a monolayer film comprising the multimodal ethylene copolymer (P) or a multilayer film, wherein at least one layer comprises the multimodal ethylene copolymer (P). The terms "monolayer film" and multilayer film" have well known meanings in the art.

The layer of the monolayer or multilayer film of the invention may consist of the multimodal ethylene copolymer (P) as such or of a blend of the multimodal ethylene copolymer (P) together with further polymer(s). In case of blends, any further polymer is different from the polymer of ethylene (P) and is preferably a polyolefin. Part of the above mentioned additives, like processing aids, can optionally added to the polymer composition during the film preparation process. Preferably, the at least one layer of the invention comprises at least 50 wt %, more preferably at least 60 wt %, even more preferably at least 70 wt %, yet more preferably at least 80 wt %, of the multimodal ethylene copolymer (P) of the invention. Most preferably said at least one layer of the film of invention consists of the multimodal ethylene copolymer (P).

Accordingly, the films of the present invention may comprise a single layer (i.e. monolayer) or may be multilayered. Multilayer films typically, and preferably, comprise at least 3 layers.

The films are preferably produced by any conventional film extrusion procedure known in the art including cast film and blown film extrusion. Most preferably, the film is a blown or cast film, especially a blown film. E.g. the blown film is produced by extrusion through an annular die and blowing into a tubular film by forming a bubble which is collapsed between nip rollers after solidification. This film can then be slit, cut or converted (e.g. gusseted) as desired. Conventional film production techniques may be used in this regard. If the preferable blown or cast film is a multilayer film then the various layers are typically coextruded. The skilled man will be aware of suitable extrusion conditions.

The resulting films may have any thickness conventional in the art. The thickness of the film is not critical and depends on the end use. Thus, films may have a thickness of, for example, 300 μm or less, typically 6 to 200 μm, preferably 10 to 180 μm, e.g. 20 to 150 μm or 20 to 120 μm. If desired, the polymer of the invention enables thicknesses of less than 100 μm, e.g. less than 50 μm. Films of the invention with thickness even less than 20 μm can also be produced whilst maintaining good mechanical properties.

The present invention is preferably related to blown extrusion films, extrusion coated substrates comprising a substrate and at least one layer of the multimodal polymer of ethylene (P) extrusion coated on said substrate as defined in this invention.

Furthermore, the present invention is also directed to the use of the inventive article as packing material, in particular as a packing material for food and/or medical products.

Determination Methods

Unless otherwise stated in the description or in the experimental part, the following methods were used for the property determinations of the polymer composition and/or any sample preparations thereof as specified in the text or experimental part.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$), 5 kg ($MFR_5$) or 21.6 kg ($MFR_{21}$).

Density

Density of the polymer was measured according to ASTM; D792, Method B (density by balance at 23° C.) on compression moulded specimen prepared according to EN ISO 1872-2 (February 2007) and is given in $kg/m^3$.

Molecular Weights, Molecular Weight Distribution (Mn, Mw, MWD)—GPC

A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. ($c_{160^\circ\,C.}$) was determined in the following way.

$$c_{160^\circ\,C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 $cm^3/g$. The calculation was performed using the Cirrus Multi-Offline SEC-Software Version 3.2 (Agilent). The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by C. Jackson and H. G. Barth (C. Jackson and H. G. Barth, "Molecular Weight Sensitive Detectors" in: Handbook of Size Exclusion Chromatography and related techniques, C.-S. Wu, $2^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i / M_i)} \quad (3)$$

For a constant elution volume interval $\Delta V_i$, where $A_i$ and $M_i$ are the chromatographic peak slice area and polyolefin molecular weight (MW) determined by GPC-LS.

Comonomer Contents: Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{klimke06, parkinson07, castignolles09} Standard single-pulse excitation was employed utilising the NOE at short recycle delays{pollard04, klimke06} and the RS-HEPT decoupling scheme{fillip05,griffin07}. A total of 1024 (1k) transients were acquired per spectra.

Quantitative $^{13}C\{^1H\}$ NMR spectra were processed, integrated and relevant quantitative properties determined from the integrals. All chemical shifts are internally referenced to the bulk methylene signal (δ+) at 30.00 ppm.

The amount of ethylene was quantified using the integral of the methylene (δ+) sites at 30.00 ppm accounting for the number of reporting sites per monomer:

$$E = I_{\delta+}/2$$

the presence of isolated comonomer units is corrected for based on the number of isolated comonomer units present:

$$E\text{total} = E + (3*B + 2*H)/2$$

where B and H are defined for their respective comonomers. Correction for consecutive and non-consecutive commoner incorporation, when present, is undertaken in a similar way.

Characteristic signals corresponding to the incorporation of 1-butene were observed and the comonomer fraction calculated as the fraction of 1-butene in the polymer with respect to all monomer in the polymer:

$$fB\text{total} = (B\text{total}/(E\text{total} + B\text{total} + H\text{total})$$

The amount isolated 1-butene incorporated in EEBEE sequences was quantified using the integral of the $_*$B2 sites at 38.3 ppm accounting for the number of reporting sites per comonomer:

$$B = I_{*B2}$$

The amount consecutively incorporated 1-butene in EEBBEE sequences was quantified using the integral of the ααB2B2 site at 39.4 ppm accounting for the number of reporting sites per comonomer:

$$BB = 2*I\alpha\alpha B2B2$$

The amount non consecutively incorporated 1-butene in EEBEBEE sequences was quantified using the integral of the ββB2B2 site at 24.7 ppm accounting for the number of reporting sites per comonomer:

$$BEB = 2*I\beta\beta B2B2$$

Due to the overlap of the *B2 and *ββB2B2 sites of isolated (EEBEE) and non-consecutivly incorporated (EEBEBEE) 1-butene respectively the total amount of isolated 1-butene incorporation is corrected based on the amount of non-consecutive 1-butene present:

$$B = I_{*B2} - 2*I_{\beta\beta B2B2}$$

The total 1-butene content was calculated based on the sum of isolated, consecutive and non consecutively incorporated 1-butene:

$$B\text{total} = B + BB + BEB$$

The total mole fraction of 1-butene in the polymer was then calculated as:

$$fB = (B\text{total}/(E\text{total} + B\text{total} + H\text{total})$$

Characteristic signals corresponding to the incorporation of 1-hexene were observed and the comonomer fraction calculated as the fraction of 1-hexene in the polymer with respect to all monomer in the polymer:

$$fH\text{total} = (H\text{total}/(E\text{total} + B\text{total} + H\text{total})$$

The amount isolated 1-hexene incorporated in EEHEE sequences was quantified using the integral of the $_*$B4 sites at 39.9 ppm accounting for the number of reporting sites per comonomer:

$$H = I_{*B4}$$

The amount consecutively incorporated 1-hexene in EEHHEE sequences was quantified using the integral of the ααB4B4 site at 40.5 ppm accounting for the number of reporting sites per comonomer:

$$HH = 2*I\alpha\alpha B4B4$$

The amount non consecutively incorporated 1-hexene in EEHEHEE sequences was quantified using the integral of the ββB4B4 site at 24.7 ppm accounting for the number of reporting sites per comonomer:

$$HEH = 2*I\beta\beta B4B4$$

The total mole fraction of 1-hexene in the polymer was then calculated as:

$$fH = (H\text{total}/(E\text{total} + B\text{total} + H\text{total})$$

The mole percent comonomer incorporation is calculated from the mole fraction:

$$B[\text{mol }\%] = 100*fB$$

$$H[\text{mol }\%] = 100*fH$$

The weight percent comonomer incorporation is calculated from the mole fraction:

$$B[\text{wt }\%] = 100*(fB*56.11)/((fB*56.11) + (fH*84.16) + ((1-(fB+fH))*28.05))$$

$$H[\text{wt }\%] = 100*(fH*84.16)/((fB*56.11) + (fH*84.16) + ((1-(fB+fH))*28.05))$$

REFERENCES klimke06: Klimke, K., Parkinson, M., Piel, C., Kaminsky, W., Spiess, H. W., Wilhelm, M., Macromol. Chem. Phys. 2006; 207:382.

parkinson07: Parkinson, M., Klimke, K., Spiess, H. W., Wilhelm, M., Macromol. Chem. Phys. 2007; 208:2128.

pollard04: Pollard, M., Klimke, K., Graf, R., Spiess, H. W., Wilhelm, M., Sperber, O., Piel, C., Kaminsky, W., Macromolecules 2004; 37:813.

filip05: Filip, X., Tripon, C., Filip, C., J. Mag. Resn. 2005, 176, 239 griffin07: Griffin, J. M., Tripon, C., Samoson, A., Filip, C., and Brown, S. P., Mag. Res. in Chem. 2007 45, S1, S198 castignolles09: Castignolles, P., Graf, R., Parkinson, M., Wilhelm, M., Gaborieau, M., Polymer 50 (2009) 2373 busico01: Busico, V., Cipullo, R., Prog. Polym. Sci. 26 (2001) 443 busico97: Busico, V., Cipullo, R., Monaco, G., Vacatello, M., Segre, A. L., Macromoleucles 30 (1997) 6251 zhou07: Zhou, Z., Kuemmerle, R., Qiu, X., Redwine, D., Cong, R., Taha, A., Baugh, D. Winniford, B., J. Mag. Reson. 187 (2007) 225 busico07: Busico, V., Carbonniere, P., Cipullo, R., Pellecchia, R., Severn, J., Talarico, G., Macromol. Rapid Commun. 2007, 28, 1128 resconi00: Resconi, L., Cavallo, L., Fait, A., Piemontesi, F., Chem. Rev. 2000, 100, 1253

Differential Scanning Calorimetry (DSC)

Experiments were performed with a TA Instruments Q200, calibrated with Indium, Zinc, Tin and according to ISO 11357-3. Roughly 5 mg of material were placed in a pan and tested at 10° C./min throughout the experiments, under 50 mL/min nitrogen flow, with lower and higher temperatures of −30° C. and 180° C. respectively. Only the second heating run was considered for the analysis.

The melting temperature Tm is defined as the temperature of the main peak of the thermogram, while the melting enthalpy (ΔHm) is calculated by integrating between 10° C. and the end of the thermogram, typically Tm+15° C. The running integral in this range is also calculated.

Sealing Properties:

Sealing Initiation Temperature (SIT):

The Sealing Initiation Temperature, SIT*, was predicted with the aid of an Artificial Neural Network. Input data was provided by Differential Scanning calorimetry, DSC.

The training of the Artificial Neural Network was performed with Python/TensorFlow/Keras by analysing at least 21 PE materials with known SIT.

The lower limit (heat sealing initiation temperature (SIT)) is the sealing temperature at which a sealing strength of >5 N is achieved.

The sealing range was determined on a J&B Universal Sealing Machine Type 3000 with a film of 40 μm thickness with the following further parameters:

Specimen width: 25.4 mm
Seal Pressure: 0.1 N/mm$^2$
Seal Time: 0.1 s
Cool time: 99 s
Peel Speed: 10 mm/s
Start temperature: 50° C.
End temperature: 150° C.
Increments: 5° C.

specimen is sealed A to A at each sealbar temperature and seal strength (force) is determined at each step.

The temperature is determined at which the seal strength reaches 5 N.

At least seventeen materials (polyethylene copolymers) were used for training, with SIT ranging from 75° C. to 113° C., roughly homogeneously spaced. At least four materials were used for the testing of the network, with SIT of ca. 92° C. for two of them, 85° C. for one of them, and 68° C. for one of them.

The input data was the melting temperature and the melting enthalpy of the material as measured by DSC, plus 6 parameters from the running integral of the thermogram. These were selected as the temperatures at 14.8%, 17.4%, and 35.8% of melting and the melting enthalpies (in J/g) at 21.8° C., 55.2° C., and 18.2° C. The integration of the thermograms started at 25° C. The input data was normalized in each column in the range [0,1].

An Artificial Neural Network was trained repeating the process till the Mean Absolute Error, MAE, on the training input was lower than 0.00151 and the MAE on the validation input was lower than 0.00349, making sure that the point at 68° C. of the testing set is predicted with an accuracy of <1° C. The validation split used was 0.15, epochs number is 400 however with early stopping i.e. saving only the network with the best MAE for the training set and a patience of 150, batch size of 1, "adam" optimizer, loss as MSE (Mean Square Error) and metrics as both MSE and MAE. The network was made of three layers fully connected, where the first two have respectively 32 and 65 nodes with relu activation function and the last layer was a single layer with linear activation function. Noise can be added to the input layer for regularization purpose, with e.g. 0.02 amplitude. Noise can also be added to the output, again with 0.02 amplitude, to help the network generalize for measurement accuracy. The training of a proper network can take 100,000 repetitions of the process till success.

Film Sample Preparation

The test films consisting of the inventive multimodal ethylene copolymer (P) and respective comparative or reference polymer compositions of 40 μm thickness, were prepared using a Collin 30 lab scale mono layer blown film line.

This line has a screw diameter of 25 millimetres (mm), L/D of 25, a die diameter of 60 mm, a die gap of 1.5 mm. The film samples were produced at 190° C. with an average thickness of 40 μm, with a 1:3 blow-up ratio, frostline distance of 120 mm. Melt temperature 190° C.

Experimental Part

Catalyst Preparation of Cat 1

2-Step Method of Catalyst Preparation

Step A: Activated carrier preparation ($SiO_2$/MAO)

20 g of pre-treated silica and 100 mL of dry Toluene were placed under nitrogen atmosphere into a multi-necked glass reactor equipped with a mechanical stirrer. The gentle mixing was started and the slurry was cooled to −10-0° C. Methylaluminoxane solution (175 mmol Al as 30 wt % MAO solution in Toluene) was then slowly added within 30 minutes, while keeping the reaction mixture temperature below 25° C. The slurry was then stirred at room temperature for further 30 minutes. After that, the stirred reaction mixture was heated up to 90° C. within 20 minutes and kept stirred at this temperature for further 2 hours. The slurry was then settled at 90° C. for 15 minutes and the hot supernatant was siphoned off. 100 mL of dry Toluene were added and the $SiO_2$/MAO carrier was washed under stirring for 30 minutes at 90° C. The carrier was settled and supernatant is siphoned off. A second carrier wash was performed in the same way as above, with a difference that the wash temperature was between 50-70° C. A third carrier wash was performed in the same way as above, with a difference that 100 mL of dry Heptane were used instead of Toluene and the wash was performed at room temperature. Supernatant was siphoned off and the activated $SiO_2$/MAO carrier was dried first in the stream of Nitrogen at 60° C. until no free liquid was observed, followed by thorough drying in vacuo for at least 2 hours at 60° C.

Step B: Pro-Catalyst Preparation

35 μmol of Rac-dimethylsilanediylbis[2-(5-trimethylsilylfuran-2-yl)-4,5-dimethylcyclopentadien-1-yl] zirconium dichloride were dissolved in a mixture of 1 mL of dry Toluene and MAO solution (1.05 mmol Al as 30 wt % MAO solution in Toluene) by stirring for 1 hour at room temperature in a glass vial under Nitrogen atmosphere. The obtained solution was then added drop-wise within 5 minutes to 1 g of the activated carrier ($SiO_2$/MAO) in a glass reactor under gentle mechanical stirring. The crude pro-catalyst was then gently mixed for 1 hour further at room temperature and left to stand for further 17 hours. The pro-catalyst was then dried in vacuo for 30 minutes at 60° C.

| Example | $Al_{(step\ A)}$: $SiO_2$ loading ratio, mmol/g | Zr: $SiO_2$/MAO loading ratio, mmol/g | $Al_{(step\ B)}$: Zr loading ratio, mol/mol | $Al_{(total)}$: Zr loading ratio, mol/mol |
|---|---|---|---|---|
| CAT 1 | 11.64 | 0.035 | 30 | 172 |

Cat. Example: Catalyst Cat 2

As catalyst Cat 2 an alumoxane containing, supported catalyst containing metallocene bis(1-methyl-3-n-butylcyclopentadienyl) zirconium (IV) chloride and with enhanced ActivCat® activator technology from Grace was used.

Polymerization: Inventive Example 1

Inventive Multimodal Polymer of Ethylene with 1-Butene and 1-Hexene Comonomers

All polymerizations were done in a stirred autoclave with a volume of 5.3 l. The polymerization procedure is described in the following:

The evacuated autoclave was filled with 800 g propane. 0.12 mmol triethylaluminium (0.62 mol/l solution in heptane) were added using a stream of additional 100 g propane. 16 g ethene and 0.0013 g hydrogen were added and the reactor was heated up to the desired prepolymerization temperature of 60° C.

The desired amount of catalyst was weighed into a steel vial inside a glove box and suspended in 3 ml heptane (8 ml if the catalyst was an oil slurry). Then the vial was attached to the polymerization autoclave and the suspension was flushed into the reactor with 100 g propane. For prepolymerization, the reactor was stirred for 45 min at 60° C. The pressure was kept constant at 20.9 barg by feeding ethene with a flow meter. Then the temperature was increased to 85° C. and the desired batch amounts of hydrogen and 1-butene were fed to the reactor. In parallel, ethene was fed until the desired polymerization pressure was reached.

For slurry polymerization, the reactor was stirred at 85° C. The pressure was kept constant by feeding ethene, 1-butene and hydrogen in a fixed ratio. After consumption of 200 g ethene, the reaction was stopped by venting and evacuating the reactor.

For the gas phase polymerization, the reactor temperature was set to 75° C. It was refilled with propane until the required pressure was reached. The desired amounts of hydrogen and 1-hexene were fed to the reactor. In parallel, ethene was fed until the reactor pressure reached 20 barg. During polymerization, the pressure was kept constant by feeding ethylene, 1-hexene and hydrogen in a fixed ratio. After consumption of the desired amount of ethylene, the reacton was stopped by venting the reactor Similar polymerization conditions were used for both catalysts.

The polymers of table 1 and 2 have been produced in a Lab Bench Scale reactor plant in a two-step polymerization process starting with a slurry step followed by polymerization in gas phase, varying the molecular weight as well as the butene and hexene content by appropriate hydrogen and comonomer feeds. The catalysts used in the polymerization process were the metallocene catalysts prepared as described above.

TABLE 1

Preparation of the examples

| Example | | IE1 | IE2 | IE3 | CE1 | CE2 |
|---|---|---|---|---|---|---|
| Catalyst | | CAT 1 | CAT 2 | CAT 1 | CAT 2 | CAT 1 |
| Slurry | | | | | | |
| 1-butene batch | [g] | 4.5 | 6.6 | 4.6 | 6.6 | 6.6 |
| $H_2$ batch | [mg] | 17 | 6 | 17 | 6 | 23 |
| pressure | [barg] | 37.4 | 36.9 | 37.4 | 36.9 | 39.2 |
| continuous feed ratio $H_2/C_2$ | [g/g] | $6.8 \cdot 10^{-5}$ | $6.8 \cdot 10^{-5}$ | $6.8 \cdot 10^{-5}$ | $6.8 \cdot 10^{-5}$ | $6.8 \cdot 10^{-5}$ |
| continuous feed ratio $C_4/C_2$ | [g/g] | 0.018 | 0.015 | 0.018 | 0.015 | 0.018 |

TABLE 1-continued

| Preparation of the examples | | | | | | |
|---|---|---|---|---|---|---|
| Example | | IE1 | IE2 | IE3 | CE1 | CE2 |
| $C_4$ in polymer | [wt %] | 1.0 | 0.7 | 0.9 | 1.1 | 1.4 |
| $C_4$ in polymer | [mol %] | 0.51 | 0.36 | 0.44 | 0.56 | 0.71 |
| Density | [kg/m$^3$] | 942 | 939 | 942 | 939 | 939 |
| $MFR_2$ | [g/10 min] | 4.0 | 2.9 | 4.0 | 2.9 | 5.8 |
| GPR | | | | | | |
| Propane partial pressure | [barg] | 14 | 14 | 10 | 14 | 10 |
| 1-hexene batch | [g] | 19.6 | 29.9 | 22.5 | 19.6 | 22.5 |
| $H_2$ batch | [mg] | 0.8 | 0.8 | 2.1 | 0.8 | 4.1 |
| $C_2H_4$ continuous feed | [g] | 220 | 230 | 278 | 220 | 278 |
| continuous feed ratio $H_2/C_2$ | [g/g] | $3.9 \cdot 10^{-05}$ | $3.9 \cdot 10^{-05}$ | $4.2 \cdot 10^{-05}$ | $3.9 \cdot 10^{-05}$ | $6.7 \cdot 10^{-05}$ |
| continuous feed ratio $C_4/C_2$ | [g/g] | 0.27 | 0.20 | 0.17 | 0.13 | 0.09 |
| $C_6$ in GPR polymer | [wt %] | 21.1 | 18.0 | 16.8 | 11.3 | 10.8 |
| $C_6$ in GPR polymer | [mol %] | 8.2 | 6.8 | 6.3 | 4.1 | 3.9 |
| Density in GPR | [kg/m$^3$] | 886 | 897 | 897 | 908 | 912 |
| $MFR_2$ in GPR | [g/10 min] | 1.1 | 3.3 | 1.0 | 2.3 | 3.4 |
| Split GPR | [wt %] | 58 | 58 | 61 | 56 | 61 |

Slurry defines the ethyene copolymer (A); GPR defines the ethyene copolymer (B)
$C_4$ is 1-butene; $C_6$ is 1-hexene

TABLE 2

| Properties of the examples | | | | | | |
|---|---|---|---|---|---|---|
| Example | | IE1 | IE2 | IE3 | CE1 | CE2 |
| Final | | | | | | |
| $MFR_2$ | [g/10 min] | 1.81 | 3.11 | 1.60 | 2.52 | 4.10 |
| Density | [kg/m$^3$] | 909.6 | 914.4 | 914.1 | 921.7 | 922.2 |
| $M_w$ | [kg/mol] | 88.5 | 80.7 | 88.8 | 84.6 | 69.1 |
| $M_n$ | [kg/mol] | 25.7 | 19.4 | 26.1 | 20.2 | 21.3 |
| Mw/Mn | | 3.4 | 4.2 | 3.4 | 4.2 | 3.2 |
| $C_4$ | [mol %] | 0.23 | 0.16 | 0.18 | 0.26 | 0.29 |
| $C_4$ | [wt %] | 0.43 | 0.30 | 0.34 | 0.49 | 0.54 |
| $C_6$ | [mol %] | 4.43 | 3.76 | 3.70 | 2.19 | 2.32 |
| $C_6$ | [wt %] | 12.19 | 10.47 | 10.32 | 6.29 | 6.63 |
| $C_4 + C_6$ | [mol %] | 4.66 | 3.92 | 3.88 | 2.45 | 2.61 |
| Ratio C4 (A)/ total C4 + C6 | mol %/ mol % | 0.11 | 0.09 | 0.11 | 0.23 | 0.27 |
| $T_m$ | [° C.] | 123.4 | 123.5 | 121.9 | 123.0 | 122.0 |
| $T_c$ | [° C.] | 108.9 | 107.9 | 106.8 | 108.6 | 105.8 |
| $\Delta H_m$ | [J/g] | 67.6 | 106.7 | 61.3 | 114.3 | 110.9 |
| SIT* | [° C] | 65.3 | 72.1 | 81.1 | 89.1 | 96.8 |
| $T_m$ − SIT* | [° C] | 58.14 | 51.4 | 40.83 | 33.91 | 25.2 |

Final defines the multimodal polymer of ethylene (P)
$C_4$ is 1-butene; C4 (A) is the butene content in copolymer (A)
$C_6$ is 1-hexene
SIT* is the heat sealing initiation temperature The polymers have been stabilized with 0.5 wt % Iganox B225.

The polymers of table 3 have been selected between commercially available resins, as additional comparative examples. In table 3 main properties of these commercial examples are given. Furthermore, in table 3, SIT* of these characterized commercially available resins is given.

TABLE 3

| Properties of the commercial examples | | | | | |
|---|---|---|---|---|---|
| Example | | FK1820 (Borealis/ Borouge) | EXCEED 1018 HA Exxon | ELITE 5400G DOW | DOWLEX NG 5056 DOW |
| $MFR_2$ | [g/10 min] | 1.5 | 1.0 | 1.0 | 1.1 |
| Density | [kg/m$^3$] | 918 | 918 | 916 | 919 |
| $M_w$ | [kg/mol] | 93.5 | 107 | 103 | 109 |
| $M_n$ | [kg/mol] | 23.9 | 50.5 | 31.6 | 29.9 |
| Comonomer | | $C_4$, $C_6$ | $C_6$ | $C_8$ | $C_8$ |
| $T_m$ | [° C.] | 120.9 | 118.1 | 118.1 | 119.3 |
| $T_c$ | [° C.] | 112.2 | 103.9 | 103.1 | 105.8 |
| $\Delta H_m$ | [J/g] | 113.5 | 107.1 | 102.2 | 107.6 |
| SIT* | [° C.] | 85 | 99 | 95 | 98 |
| $T_m$-SIT* | [° C.] | 35.9 | 19.1 | 23.1 | 21.3 |

$C_4$ is 1-butene, $C_6$ is 1-hexene, $C_8$ is 1-octene
SIT* is the heat sealing initiation temperature
$MFR_2$ and density are reported and extracted in the technical datasheet of each grade The inventive examples show improved/lowered SIT and additionally a broader sealing window over the comparative examples.

The invention claimed is:

1. A multimodal ethylene copolymer (P) comprising a) an ethylene polymer (A) having a MFR2 of 1 to 50 g/10 min (190° C., 2.16 kg, ISO 1133), having a comonomer content in the range of 0.05 mol % to less than 1.0 mol %, the comonomer being selected from $C_4$ to $C_{12}$ α-olefins, and b) an ethylene copolymer (B) having a comonomer content in the range of 5.6 mol % to 10.0 mol %, the comonomer being selected from $C_4$ to $C_{12}$ α-olefins, whereby the comonomer of ethylene copolymer (B) is different from the comonomer of ethylene copolymer (A) and wherein further (i) the multimodal ethylene copolymer (P) has a total comonomer content in the range of 3.2 mol % to 5.7 mol %, (ii) the weight ratio of the ethylene copolymer (A) to the ethylene copolymer (B) is in the range of 25/75 to below 60/40, and iii) the multimodal ethylene copolymer (P) has an Mw/Mn between 2.3 and 4.8.

2. The multimodal ethylene copolymer (P) according to claim 1, wherein the ethylene polymer component (A) has a $MFR_2$ (190° C., 2.16 kg, ISO 1133) of 1.0 to 40.0 g/10 min.

3. The multimodal ethylene copolymer (P) according to claim 1, wherein the MFR2 (190° C., 2.16 kg, ISO 1133) of the multimodal ethylene copolymer (P) is in the range of from 0.5 to 7.0 g/10 min.

4. The multimodal ethylene copolymer (P) according to claim 1, wherein the ratio of an amount (mol %) of alpha-olefin comonomer having from 4 to 12 carbon atoms present in ethylene polymer component (A)] to an amount (mol %) of at least two alpha-olefin comonomers having from 4 to 12 carbon atoms of the final multimodal ethylene copolymer (P)] is 0.05 to 0.20.

5. The multimodal ethylene copolymer (P) according to claim 1, wherein the density of the multimodal ethylene copolymer (P) is in the range of 905 to 920 $kg/m^3$.

6. The multimodal ethylene copolymer (P) according to claim 1, wherein a melting temperature (Tm) measured according to ISO 11357-3 of the ethylene copolymer composition (P) is in the range of 117° C. to 133° C.

7. The multimodal ethylene copolymer (P) according to claim 1, wherein the multimodal ethylene copolymer (P) has a sealing initiation temperature (SIT), determined as described in the experimental part, between 55° C. and 90° C.

8. The multimodal ethylene copolymer (P) according to claim 1, wherein the multimodal ethylene copolymer (P) has a difference between a melting temperature (Tm) and a sealing initiation temperature (SIT), determined as described in the Experimental part, Tm−SIT, of at least 37° C.

9. The multimodal ethylene copolymer (P) according to claim 1, wherein the ratio of the MFR2 (190° C., 2.16 kg, ISO 1133) of ethylene polymer component (A) to the MFR2 (190° C., 2.16 kg, ISO 1133) of the final multimodal ethylene copolymer (P) is between 0.5 to 30.

10. The multimodal ethylene copolymer (P) according to claim 1, wherein ethylene polymer component (B) has a density in the range of 880 to 915 $kg/m^3$.

11. The multimodal ethylene copolymer (P) according to claim 1, wherein the multimodal ethylene copolymer (P) is produced using the organometallic compound (C) of formula (I):

$$(L)_m R_n MX_q \quad (I)$$

wherein

"M" is zirconium (Zr), hafnium (Hf), or titanium (Ti), each "X" is independently a monoanionic ligand, each "L" is independently an organic ligand which coordinates to the transition metal "M", and comprising a cyclopentadienyl, indenyl, or fluorenyl ligand, "R" is a bridging group linking said organic ligands (L), "m" is 1, 2 or 3

"n" is 0, 1 or 2,

"q" is 1, 2 or 3, and m+q is equal to the valence of the transition metal (M) or an organometallic compound (C) of formula (II):

(II)

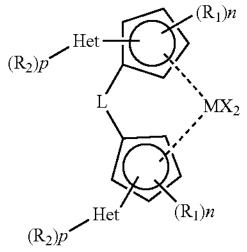

wherein each X is independently a halogen atom, a C1-6-alkyl, C1-6-alkoxy group, phenyl or benzyl group;

each Het is independently a monocyclic heteroaromatic containing at least one heteroatom selected from O or S;

L is —R'2Si—, wherein each R' is independently C1-20 hydrocarbyl or C1-10 alkyl substituted with alkoxy having 1 to 10 carbon atoms;

M is Ti, Zr or Hf;

each R1 is the same or different and is a C1-6 alkyl group or C1-6 alkoxy group;

each n is 1 to 2;

each R2 is the same or different and is a C1-6 alkyl group, C1-6 alkoxy group or —Si(R)3 group;

each R is C1-10 alkyl or phenyl group optionally substituted by 1 to 3 C1-6 alkyl groups; and each p is 0 to 1, whereby ethylene polymer component (A) is produced in a first polymerization zone and the ethylene polymer component (B) is produced in a second polymerization zone.

12. A film comprising the multimodal ethylene copolymer (P) according to claim 1, whereby the film is a monolayer film comprising the multimodal ethylene copolymer (P) or a multilayer film, wherein at least one layer comprises the multimodal ethylene copolymer (P).

13. The film according to claim 12, wherein the film is a blown extrusion film, or is part of an extrusion coated substrate comprising a substrate and at least one layer of the multimodal ethylene copolymer (P) extrusion coated on said substrate.

* * * * *